(12) United States Patent
Roper et al.

(10) Patent No.: US 10,931,663 B2
(45) Date of Patent: Feb. 23, 2021

(54) TERMINAL AUTHENTICATED ACCESS

(71) Applicant: NCR Corporation, Duluth, GA (US)

(72) Inventors: Anthony Edward Roper, Angus (GB); Colin George Herkes, Fife (GB)

(73) Assignee: NCR Corporation, Atlanta, GA (US)

( * ) Notice: Subject to any disclaimer, the term of this patent is extended or adjusted under 35 U.S.C. 154(b) by 320 days.

(21) Appl. No.: 15/904,759

(22) Filed: Feb. 26, 2018

(65) Prior Publication Data

US 2019/0268325 A1    Aug. 29, 2019

(51) Int. Cl.
*H04L 29/06*  (2006.01)
*H04L 9/14*   (2006.01)
*H04L 9/32*   (2006.01)

(52) U.S. Cl.
CPC .............. *H04L 63/083* (2013.01); *H04L 9/14* (2013.01); *H04L 9/3271* (2013.01); *H04L 63/0876* (2013.01)

(58) Field of Classification Search
CPC .............. H04L 63/083; H04L 63/0876; H04L 63/0442; H04L 9/14; H04L 9/3271; H04L 9/3226; H04L 9/3228; H04L 9/3247; H04L 9/3234; H04L 2463/082
See application file for complete search history.

(56) References Cited

U.S. PATENT DOCUMENTS

| 9,947,008 | B1 * | 4/2018 | Camacho Diaz | ............................. G06Q 20/38215 |
| 2007/0136573 | A1 * | 6/2007 | Steinberg | ................ G06F 21/43 713/155 |
| 2007/0195998 | A1 * | 8/2007 | Le Saint | ................. G06F 21/32 382/115 |
| 2008/0098464 | A1 * | 4/2008 | Mizrah | .................... G06F 21/36 726/5 |
| 2013/0227677 | A1 * | 8/2013 | Pal | .......................... G06F 21/33 726/19 |
| 2014/0115341 | A1 * | 4/2014 | Robertson | ............. H04L 9/3228 713/183 |
| 2014/0380445 | A1 * | 12/2014 | Tunnell | .................... G06F 21/00 726/7 |
| 2015/0067793 | A1 * | 3/2015 | Robison, Jr. | ........ H04L 63/0838 726/5 |
| 2016/0330172 | A1 * | 11/2016 | Muttik | ................ H04L 63/0281 |
| 2017/0317828 | A1 * | 11/2017 | Reinhold | ................ G06F 21/31 |

* cited by examiner

*Primary Examiner* — Khoi V Le
(74) *Attorney, Agent, or Firm* — Schwegman, Lundberg & Woessner

(57) ABSTRACT

Two-factor authentication is processed on a transaction terminal before access is provided to a secure resource of the transaction terminal. A first factor authentication is performed to authenticate an identifier and a credential of a user. A unique challenge is sent, in response to a successful first factor authentication, to a secure device interfaced to the transaction terminal. A one-time unique signed response is received from the secure device in response to the unique challenge and a user action that depresses a button on the secure device. The one-time unique signed response is compared against what is expected from the secure device. When the comparison is successful, a user identity for the user is set, a security role is set for the user identity, and the user is granted access to the secure resource with the set security role.

7 Claims, 4 Drawing Sheets

US 10,931,663 B2

TERMINAL AUTHENTICATED ACCESS

BACKGROUND

Secure access to transaction terminals is of utmost import in the industry. Consider, a particular type of transaction terminal, an Automated Teller Machine (ATM) that dispenses currency to customers. If an intruder is able to successfully circumvent on-ATM security to log into the ATM for access to system functions, then the ATM can install nefarious applications that can cause the ATM to dispense currency held in the ATM safe through the currency dispenser. Alternatively, access to the safe may be granted through a compromised system function permitting an intruder to empty the safe of its currency.

As still another example, security cameras integrated into the ATM may be disabled through system functions allowing for card skimmers to be installed to capture customer information during ATM transactions, such that the intruder can transmit that customer information to a device of the intruder for purposes of subsequently obtaining access to customer accounts with a financial institution.

In fact, these example situations are just a small subset of criminal actions that can be taken on an ATM when an intruder gains unauthorized access to the system functions of an ATM.

Conventionally, a variety of security measures have been deployed by ATM operators to ensure ATM security. One popular approach is for support engineers to possess a key dongle and knowledge of a 6 digit Personal Identification Number (PIN). A support engineer interfaces the key dongle to the ATM and enters his/her 6 digit PIN. The ATM verifies the PIN, interacts with the key dongle through encrypted messages, and validates that a serial number for the dongle exists in a white list maintained in secure memory of the ATM. These dongles are easily replicated with publicly available software and a 6 digit PIN can be hacked in a short amount of time with software-password hacking software.

Additionally, on-ATM password (PIN) management is processing intensive and the underlying operating system (OS) of the ATM controls supervisory passwords, such that should the OS be compromised all security installed on the ATM can be circumvented.

SUMMARY

In various embodiments, methods and a terminal are provided for authenticated access to the terminal.

According to an embodiment, a method for authenticated access to a transaction terminal is provided. Specially, and in an embodiment, an event is detected that is attempting access to a resource of a terminal. In response thereto, a first-factor authentication is processed. When the first-factor authentication is successful, a challenge is sent to a secure device that is interfaced to the terminal. Next, a one-time unique signed response is received from the secure device in response to sending the challenge. A second-factor authentication is performed based on the one-time unique signed response. When the second-factor authentication is successful, access is granted to the resource of the terminal.

DETAILED DESCRIPTION

Figure 1:
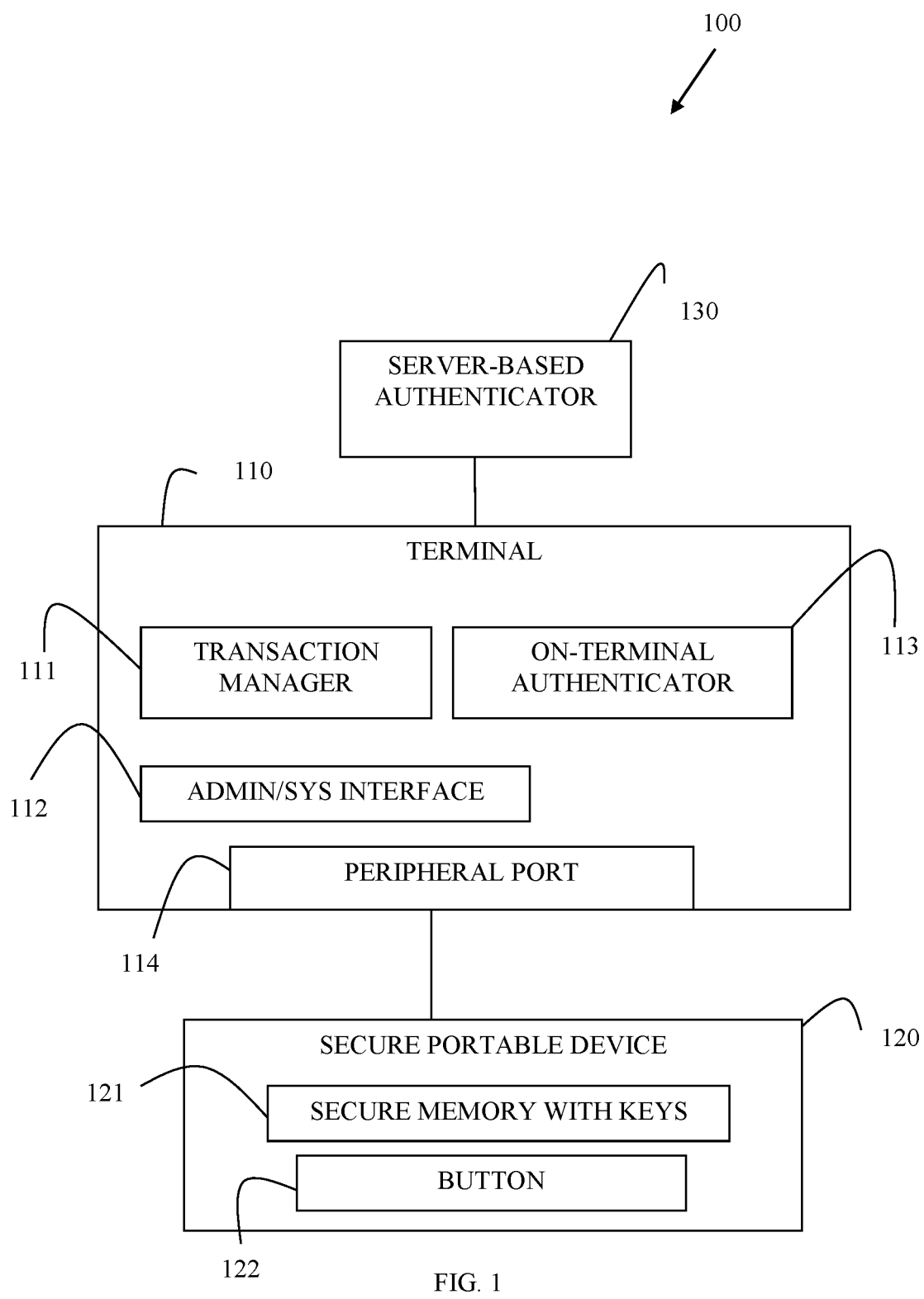
FIG. 1 is a diagram illustrating components of a transaction terminal authentication system, according to an example embodiment.

FIG. 1 is a diagram illustrating components of a transaction terminal authentication system 100, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings authenticated access to system/administrative interfaces/functions of a transaction terminal 110, presented herein and below.

Furthermore, the techniques and the systems presented herein and below (for authenticated transaction terminal access) may include all or some combination of the components shown with the system 100. The methods are programmed as executable instructions in memory and/or non-transitory computer-readable storage media and executed on one or more processors associated with the components/devices.

Specifically, the system 100 includes a transaction terminal 110 (hereinafter just "terminal 100"), a transaction manager 111, an administrator/system interface 112 (hereinafter just "interface 112"), an on-terminal authenticator 113, at least one peripheral port 114 (hereinafter just "port 114"), and a secure portable device 120 (hereinafter just "device 120"). In an embodiment, the system 100 includes an off-device (remote/external) server-based authenticator 130.

The authenticator 113 (and/or the server-based authenticator 130) and the device 120 combined to provide processing for two-factor authentication of a user that is attempting to gain access to the interface 112 (and the underlying system or administrative operations provided through the interface 112).

The device 120 includes secure memory that houses cryptographically unique keys 121 uniquely associated with a particular user. The keys 121 require no driver and provide a mechanism for uniquely identifying the particular user. The secure memory, having the keys 121, are molded in plastic that cannot be dismantled. The device 120 also includes a single interface button 122.

When a user attempts to gain access to the interface 112, the user is asked (through a sign-on interface) to enter an identifier and a password, which is provided back to the authenticator 113 as a first factor authentication. Assuming, the first factor is authenticated, the authenticator 113 then causes the sign-on interface to instruct the user to interface the secure portable device 120 to the port 114 of the terminal 110. Once the device 120 is detected, the authenticator 113 issues a challenge message directly to the device 120. The user, through the sign-on interface, is asked to press a button 122 located on the device 120. This generates a response from the device 120 signed with the keys 121 from the secure memory, and the signed response provided from the device 120 back to the authenticator 113. Based on the signed response received and the expected identity for the user (obtained from the first factor authentication), the authenticator authenticates the user in a second factor of authentication. The challenge is randomly generated by the authenticator 113 and based on the device 120 assigned to the user, the authenticator verifies that the signed response provided from the device 120 is what was expected by the authenticator 113 (the authenticator 113 generating an expected response and compares the received response to that expected response and validates a signature of the device 120).

Assuming, both the first factor and second factor authentication are successfully verified by the authenticator 113, the authenticator 113 assigns a user identity to the user and assigns a security role associated with the user identity. The interface 112 is then initiated on the terminal 110 for a user session with the terminal 110 with security set to the security role assigned to the user identity. The available security functions accessible through the interface 112 are constrained by the assigned security role set by the authenticator 113 for the session.

The challenge and response are unique for each sign-on attempt made at the terminal 110. That is, each challenge and response is non-repeatable and unique.

In an embodiment, the challenge and response utilizes a different key 121 for encryption based on the application (interface 112) that the user is attempting to access.

In an embodiment, the button on the device 120 (the user pushes the button 122 to generate a unique one-time-only signed response to a challenge issued by the authenticator 113) may also capture biometric information registered to the user, such as a fingerprint scan. This biometric information is also passed with the signed response or as a portion of the signed response and can be validated by the authenticator 113 based on registered biometric information for the user. In this way, a third factor authentication can be performed by the authenticator 113 (third-factor including biometric authentication of the user).

In an embodiment, the authenticator 113 and the device 120 combine to provide Universal Second Factor (U2F) authentication of a user attempting to authenticate to the terminal 110 for access to the interface 112 (or a system or administrative operation accessible from the interface 112). The authentication certified by the FIDO open standard for authentication. The device 120 is viewed as a U2F token or set of tokens (based on the cryptographically secure and unique keys housed in the secure tamper-resistant memory of the device 120) assigned to a particular user identity of a particular user.

The authenticator 113 also maintains an on-terminal list of assigned device identifiers for devices 120. This encrypted and stored in secure memory of terminal 110. The user identifiers for each user is also maintained with the list, such that the authenticator can verify the device identifier for the device 120 and verify its association to the user during the second factor authentication processing performed by the authenticator 113. A secure interface or a secure remote network-based update process can provide the initial list to the authenticator 113 or update the list on the terminal 110.

In an embodiment, the list is encrypted with a private key of the terminal 110, where the private key is accessible only to the authenticator 113 from secure memory of the terminal 110 and non-transferrable or capable of being copied off the terminal 110; decryption and encryption utilizing the private key is processed by a separate secure cryptographic processor on the terminal 110.

In an embodiment, the above-noted processing is processed off-terminal by the server-based authenticator 130 in manners similar to that which was discussed above for the authenticator 113. In this embodiment, the list of valid device identifiers for valid devices 120 is maintained securely on the server. In this embodiment, the authenticator 113 becomes an agent on the terminal 110 that communicates with the server-based authenticator 130 for first and second factor authentication.

In an embodiment, the authenticator 113 is callable from the boot processing of the terminal 110 (BIOS), such that during a boot cycle of the terminal 110 a user is required to insert the device 120. This can be done for purposes of verifying when the terminal 110 is being booted from an interfaced disk or a remote network location rather than the hard drive of the terminal 110 for purposes of authenticating the request to boot from a location other than the hard drive.

In an embodiment, the authenticator 113 and the two-factor authentication is initiated anytime a call or operation is attempting to be processed on the terminal 110 that requires added security based on a security policy for the call or operation and based on a current assigned security role for the user/process that is attempting to make the call or operation. This can occur when such a call or operation is attempted from the transaction manager 111 (such as a key sequence made within the processing context of the transaction manager that attempts to exit the transaction manager and access a command line interface of the terminal 110 or access the interface 112). In an embodiment, any event associated with detection of a new peripheral interfaced to the terminal 110 triggers initiation of the authenticator 113 before such new peripheral is accepted for access on the terminal 110. Such events are detected by the OS of the terminal 110 and provided to the authenticator 113 before the OS processes the call or operation and can be done through OS registration of the events and/or OS hooking to the authenticator 113.

In an embodiment, the first factor authentication (user identifier and password/credential) is performed by a modified login-process designed to call the authenticator 113 for processing the second factor authentication (issued challenge from the authenticator 113 with signed response of device 120). In such an embodiment, the authenticator 113 provides an indication on success or failure of the second factor authentication back to the modified login-process, which then assigns the security role to the authenticating user for a session with the terminal 110. In this way, existing sign-on processes can be modified/enhanced to call the authenticator 113 for enhanced second factor authentication and set security roles based on a response from the authenticator 113.

In an embodiment, the authenticator 113 provides all sign-on authentication for the terminal 110 and replaces existing sign-on authentication processes for the terminal 110.

In an embodiment, the terminal 110 is a Self-Service Terminal (SST). In an embodiment, the SST is an ATM. In an embodiment, the SST is a kiosk.

In an embodiment, the terminal 110 is a Point-Of-Sale (POS) terminal.

The above discussed embodiments and other embodiments are now discussed with reference to the FIGS. 2-4.

Figure 2:
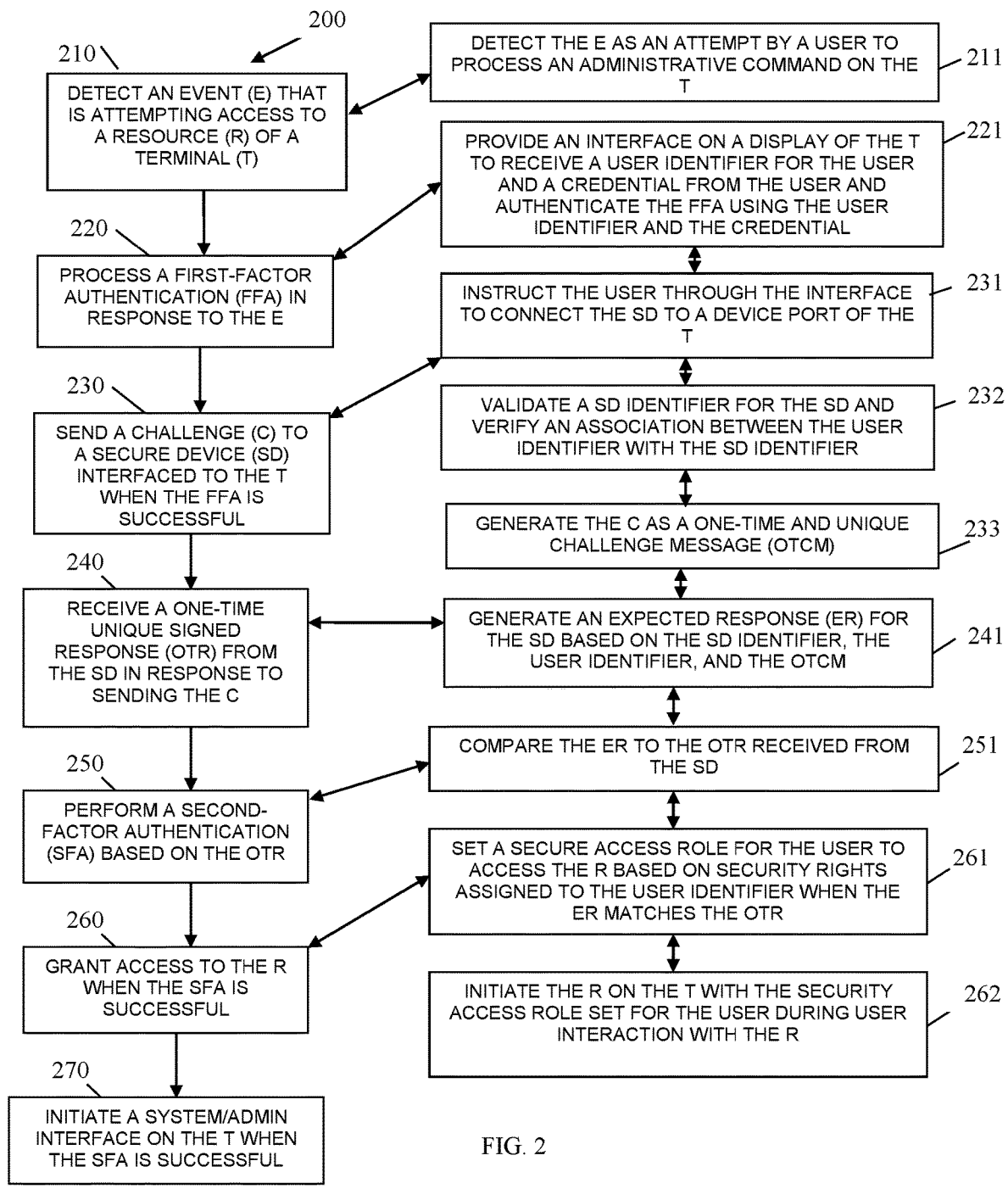
FIG. 2 is a diagram of a method for authenticated access to a transaction terminal, according to an example embodiment.

FIG. 2 is a diagram of a method 200 for authenticated access to a transaction terminal, according to an example embodiment. The software module(s) that implements the method 200 is referred to as an "authenticator." The authenticator is implemented as executable instructions programmed and residing within memory and/or a non-transitory computer-readable (processor-readable) storage medium and executed by one or more processors of a device. The processor(s) of the device that executes the authenticator are specifically configured and programmed to process the authenticator. The authenticator may have access to a network during its processing. The network can be wired, wireless, or a combination of wired and wireless.

In an embodiment, the device that executes the authenticator lacks network connectivity to external resources during authentication processing of a user that is attempting to access a secure resource requiring authentication processing by the authenticator.

In an embodiment, the device that executes the authenticator is the terminal 110. In an embodiment, the terminal is a SST. In an embodiment, the SST is an ATM. In an embodiment, the SST is a kiosk. In an embodiment, the terminal is a POS terminal.

In an embodiment, the device that executes the authenticator is a server that is remote and external to a transaction terminal where an attempt is being made to access a secure resource of the transaction terminal. In an embodiment, the authenticator is the authenticator 130.

In an embodiment, the authenticator is the authenticator 113.

As used herein a "secure resource" includes: a file, an application, a software service, an interface, a software interface, a command, an operation, a database, a host computing device, a peripheral device, and/or a setting or attribute for any of these.

In an embodiment, the secure resource is the interface 112.

At 210, the authenticator detects an event that is attempting to access a protect resource of a terminal. The event can be registered for notification with the OS of the terminal and/or be used during a boot process to initiate the authenticator (as discussed above with the FIG. 1).

According to an embodiment, at 211, the authenticator detects the event as an attempt by a user to process an administrative command on the terminal, such as a reserved key sequence that initiate the interface 120 or such as a login initiated through login interface to access the interface 120.

At 220, the authenticator processes a first-factor authentication in response to the detected event at 210.

In an embodiment, at 221, the authenticator provides an interface on a display of the terminal for receiving a user identification (user identifier (id)) and a user-supplied credential (such as a password or a PIN) entered by the user into fields of the interface. The authenticator authenticates the user for a first-factor authentication based on the inputted user id and the inputted credential.

At 230, the authenticator sends a challenge to a secure device interfaced/connected to the terminal when the first-factor authentication is successful.

It is to be noted that should the first-factor authentication or the second-factor authentication (discussed below at 250) fail or be unsuccessful, the authenticator denies access to the resource.

According to an embodiment of 221 and 230, at 231, the authenticator instructs the user through the interface to connect the secure device to a device port of the terminal. In an embodiment, the device port is a USB port of the terminal.

In an embodiment of 231 and at 232, the authenticator validates a secure device identifier and verifies an association between the user identifier and the secure device identifier. This can be maintained in the manner discussed above for the secure list maintained in secure memory of the terminal.

In an embodiment of 232 and at 233, the authenticator generates the challenge as a one-time and unique challenge message. One time because the challenge is not repeated during subsequent iterations of the authenticator for other second-factor authentication processing associated with the user or different users having different secure devices. This can be a randomly generated challenge.

At 240, the authenticator receives a one-time and unique signed response from the secure device in response to the sending of the challenge from the authenticator to the secure device.

In an embodiment of 233 and 240, at 241, the authenticator generates an expected response for the secure device based on the secure device identifier, the user identifier, and the one-time unique challenge message (sent from the authenticator to the secure device). It is noted that the response from the secure device is generated when the user pushes a button on the secure device and the response is based on the challenge message and signed with keys housed in secure memory that is tamper-resistant on the secure device.

At 250, the authenticator performs a second-factor authentication based on the one-time unique signed response message obtained from the secure device (after the user pushes a button on the secure device to initiate generation of the response message on the secure device).

In an embodiment of 241 and 250, at 251, the authenticator compares the expected result to the one-time unique signed response. It is noted that the comparison can be a hash value produced by the authenticator as the expected results and a second hash value produced from the signed response.

At 260, the authenticator grants access to the resource when the second-factor authentication is successful.

In an embodiment of 251 and 260, at 261, the authenticator sets a secure access role for the user to access the resource based on security rights assigned to the user identifier when the expected result matches the one-time unique signed message obtained from the secure device in response to sending the challenge.

In an embodiment of 261, at 262, the authenticator initiates the resource on the terminal with the security access role set for the user during user interaction with the resource.

According to an embodiment, at 270, the authenticator initiates a system/administrative interface on the terminal when the second-factor authentication is successful, such as interface 120.

Figure 3:
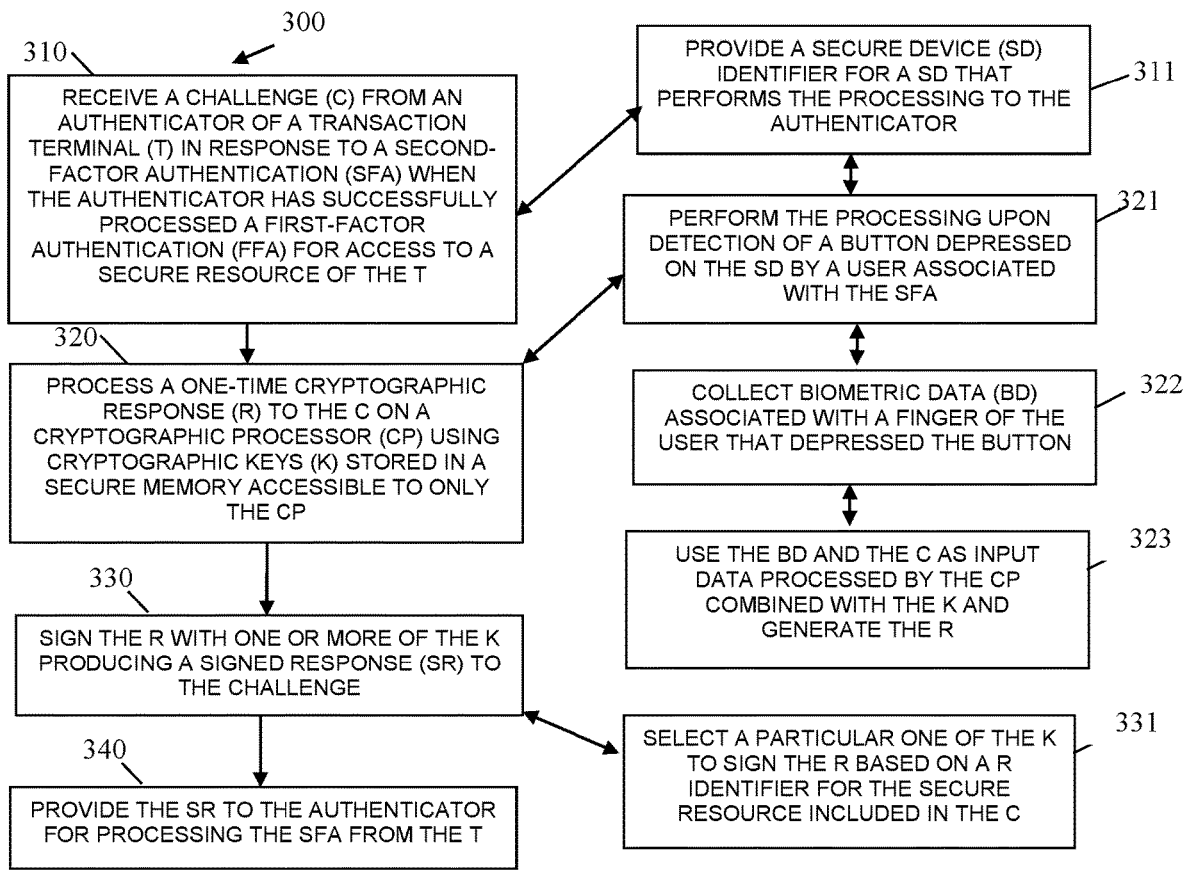
FIG. 3 is a diagram of another method for authenticated access to a transaction terminal, according to an example embodiment.

FIG. 3 is a diagram of another method 300 for authenticated access to a transaction terminal, according to an example embodiment. The software module(s) that implements the method 300 is referred to as an "authentication agent." The authentication agent is implemented as executable instructions programmed and residing within memory and/or a non-transitory computer-readable (processor-readable) storage medium and executed by one or more processors of a hardware device. The hardware processors that execute the authentication agent are specifically configured and programmed to process authentication agent. The authentication agent may have access to one or more networks during its processing. Each network can be wired, wireless, or a combination of wired and wireless.

In an embodiment, the authentication agent provides processing occurring on a secure device during two-factor authentication processing. The authentication agent directly interacts with an authenticator executing on transaction terminal or indirectly interacts with an authenticator processed remotely from the transaction terminal on a server through the transaction terminal communications passed to and from the authentication agent to and from the server.

In an embodiment, the device that executes the authentication agent is the device 120.

In an embodiment, the device that executes the authentication agent is a FIDO-compliant U2F token device.

In an embodiment, the authentication agent interacts with the authenticator 113.

In an embodiment, the authentication agent interacts with the authenticator 130.

In an embodiment, the authentication agent interacts with the method 200.

The authentication agent is initiated during a second factor authentication when authentication is required to access a secure resource of a transaction terminal. The secure resource can be any of the secure resources referenced above with the FIG. 2. In an embodiment, the secure resource is the interface 112. In an embodiment, the transaction terminal is a SST. In an embodiment, the SST is an ATM. In an embodiment, the SST is a kiosk. In an embodiment, the transaction terminal is a POS terminal. In an embodiment, the transaction terminal is the terminal 110.

At 310, the authentication agent receives a challenge from an authenticator of a transaction terminal in response to a second-factor authentication when the authenticator has successfully processed a first-factor authentication for an access request to a secure resource of the transaction terminal.

In an embodiment, at 311, the authentication agent provides a secure device identifier for a secure device that performs the processing of the authentication agent. This can be standard OS device identification of the secure device when connected to a device port of the transaction terminal in which the OS obtains the secure device identifier and makes available to the authenticator.

At 320, the authentication agent processes a one-time cryptographic response to the challenge on a cryptographic processor using cryptographic keys stored in a tamper-resistant secure memory and accessible to only the cryptographic processor. In an embodiment, the cryptographic processor and memory is molded in plastic on the secure device that processes the authentication agent, such that it is deactivated and becomes unusable should and attempt be made to manually access the processor or memory by an intruder.

In an embodiment of 311 and 320, at 321, the authentication agent performs the processing upon detection of a button depressed on the secure device by a user-associated with the second-factor authentication.

In an embodiment of 321 and at 322, the authentication agent collects biometric data associated with a finger of the user that depressed the button on the secure device that executes the authentication agent.

In an embodiment of 322 and at 323, the authentication agent uses the biometric data and the challenge as input data processed by cryptographic processor combined with the key and the authentication agent generates the one-time cryptographic response.

At 330, the authentication agent signs the one-time cryptographic response with one or more of the cryptographic keys producing a signed response to the challenge.

In an embodiment, at 331, the authentication agent selects a particular one of the keys to sign the cryptographic response based on a resource identifier for the secure resource included in the challenge. This allows the response to be specific to the resource that a user is attempting to access on the transaction terminal.

At 340, the authentication agent provides (makes available for obtaining from the secure device in a separate storage or memory on the secure memory or sends from the secure device) the signed response for the authenticator to process the second-factor authentication.

Figure 4:
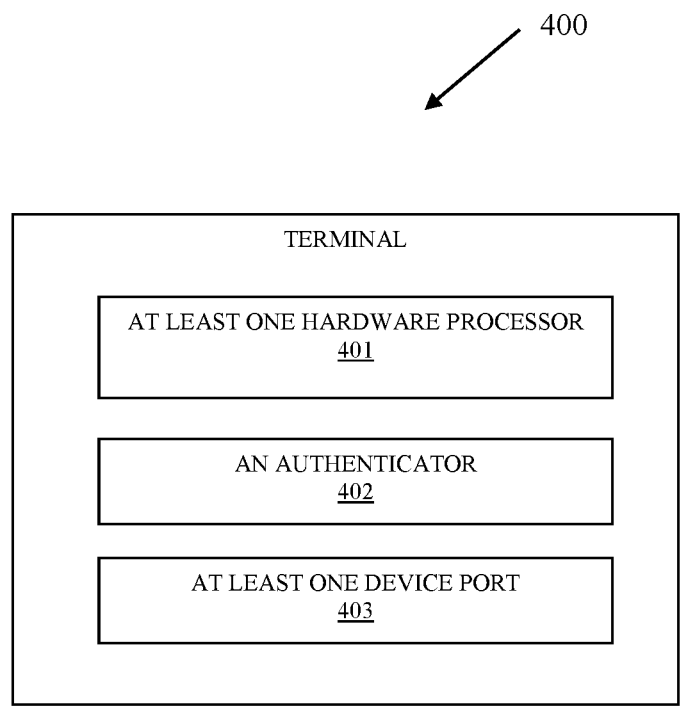
FIG. 4 is a diagram of a transaction terminal for processing authenticated access, according to an example embodiment.

FIG. 4 is a diagram of a transaction terminal 400 (hereinafter just "terminal 400") for processing authenticated access, according to an example embodiment. Some components of the terminal 400 are programmed and reside within memory and/or a non-transitory computer-readable medium and execute on one or more processors of the terminal 400. The terminal 400 communicates over one or more networks, which can be wired, wireless, or a combination of wired and wireless.

In an embodiment, the terminal 400 does not have or lacks any network connectivity during the two-factor authentication processing performed by the terminal 400.

In an embodiment, the terminal 400 is the terminal 110.

In an embodiment, the terminal 400 is a POS terminal.

In an embodiment, the terminal 400 is a SST. In an embodiment, the SST is an ATM. In an embodiment, the terminal 400 is a kiosk.

In an embodiment, the terminal 400 implements, among other things, the processing discussed in the FIGS. 1-2.

The terminal 400 includes a hardware processor 401, an authenticator 402, and a device port 403.

In an embodiment, the authenticator 402 is the authenticator 113.

In an embodiment, the authenticator 402 is the method 200.

In an embodiment, the device port 403 is a Universal Serial Bus (USB) port.

In an embodiment, the device port 403 is the port 114.

The hardware processor 401 is configured to execute instructions that represent the authenticator 402 where the instructions reside in a non-transitory computer-readable medium of the terminal 400.

The authenticator 402 is configured to: 1) execute on the hardware processor 401, 2) process a first-factor authentication on a user attempting to access a secure resource of the terminal, 3) process a second-factor authentication based on interactions with a secure device connected to a device port 403 of the terminal, wherein the interactions include: a unique one-time challenge generated by the authenticator and provided to the secure device and receipt of a one-time and unique response generated by the secure device in response to the challenge and the user depressing a button on the secure device, 4) set a secure role for the user to access the secure resource when the first-factor authentication and the second-factor authentication are successful, and 5) grant the user access to the secure resource with the secure role set when the first-factor authentication and the second-factor authentication are successful.

In an embodiment, the secure resource is the interface 120.

In an embodiment, the secure resource is a system or an administrative command or operation.

In an embodiment, the secure resource is a boot disk that the terminal 400 is to boot from during a boot cycle of the terminal 400.

As described herein, one-time challenge or response means a transaction-specific and non-repeatable message. The message can be randomly generated strings or numbers that the authenticator can perform cryptographic operations on, such as generating hash values. The message may in some cases also include encrypted biometric data, such as was discussed above with embodiments of the FIG. 3 and may include resource identifiers for resources. In an embodiment, the challenges and response conform the FIDO standard of U2F authentication.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving a challenge from an authenticator of a transaction terminal in response to a second-factor authentication when the authenticator has successfully processed a first-factor authentication for access to a secure resource of the transaction terminal, wherein receiving further includes receiving the challenge over a Universal Serial Bus (USB) connection to the transaction terminal;
   processing a one-time cryptographic response to the challenge on a cryptographic processor using cryptographic keys stored in a secure memory accessible to only the cryptographic processor;
   performing the processing upon collecting biometric data for a user associated with the second factor authentication;
   generating the one-time cryptographic response using the biometric data and the challenge as input data processed by the cryptographic processor combined with the cryptographic keys;
   signing the one-time cryptographic response with one or more of the cryptographic keys producing a signed response to the challenge; and
   providing the signed response back to the authenticator over the USB connection for processing the second-factor authentication from the transaction terminal.

2. The method of claim 1, wherein receiving further includes providing a secure device identifier for a secure device processing the method to the authenticator.

3. The method of claim 2, wherein providing further includes providing the secure device identifier upon the USB connection of the secure device to a USB device port of the transaction terminal.

4. The method of claim 3, wherein processing further includes performing the processing upon detection of a button depressed on the secure device by the user associated with the second factor authentication and collecting the biometric data as finger print data of the user when the button was depressed.

5. The method of claim 1, wherein signing further includes selecting a particular one of the cryptographic keys to sign the response based on a resource identifier for the secure resource included in the challenge.

6. A terminal, comprising:
   a hardware processor; and
   an authenticator;
   wherein the authenticator configured to:
   i) execute on the hardware processor,
   ii) process a first-factor authentication on a user attempting to access a secure resource of the terminal,
   iii) process a second-factor authentication based on interactions with a secure device connected to a Universal Serial Bus (USB) device port of the terminal,
   wherein the interactions include: a unique one-time challenge generated by the authenticator and provided to the secure device and receipt of a one-time and unique response generated by the secure device in response to the challenge and the user depressing a button on the secure device,
   wherein fingerprint data is collected for the user as biometric data when the user depresses the button, and
   wherein the one-time and unique response is generated using the biometric data and the one-time challenge as input data processed by a cryptographic processor combined with cryptographic keys,
   iv) set a secure role for the user to access the secure resource when the first-factor authentication and the second-factor authentication are successful, and
   v) grant the user access to the secure resource with the secure role set when the first-factor authentication and the second-factor authentication are successful.

7. The terminal of claim 6, wherein the terminal is one of: Self-Service Terminal (SST), an Automated Teller Machine (ATM), a kiosk, a Point-Of-Sale (POS) terminal.

* * * * *